(12) United States Patent
Lan et al.

(10) Patent No.: US 11,304,273 B2
(45) Date of Patent: Apr. 12, 2022

(54) VARIABLE RESISTANCE POWER ADJUSTMENT DEVICE AND LAMP

(71) Applicant: SHENZHEN GUANKE TECHNOLOGIES CO., LTD, Shenzhen (CN)

(72) Inventors: Qing Lan, Shenzhen (CN); Ligen Liu, Shenzhen (CN); Shoubao Chen, Shenzhen (CN); Tianlong Dai, Shenzhen (CN)

(73) Assignee: SHENZHEN GUANKE TECHNOLOGIES CO., LTD, Shenzhen (CN)

( * ) Notice: Subject to any disclaimer, the term of this patent is extended or adjusted under 35 U.S.C. 154(b) by 15 days.

(21) Appl. No.: 16/941,869

(22) Filed: Jul. 29, 2020

(65) Prior Publication Data

US 2021/0410243 A1 Dec. 30, 2021

(30) Foreign Application Priority Data

Jun. 24, 2020 (CN) .......................... 202021211802.4

(51) Int. Cl.
| | |
|---|---|
| *H05B 45/10* | (2020.01) |
| *H01C 10/10* | (2006.01) |
| *H05B 47/105* | (2020.01) |
| *F21K 9/233* | (2016.01) |
| *H05B 45/357* | (2020.01) |
| *F21K 9/238* | (2016.01) |
| *F21Y 115/10* | (2016.01) |

(52) U.S. Cl.
CPC ............. *H05B 45/10* (2020.01); *F21K 9/233* (2016.08); *F21K 9/238* (2016.08); *H05B 45/357* (2020.01); *F21Y 2115/10* (2016.08)

(58) Field of Classification Search
CPC ....... H05B 45/10; H05B 45/357; F21K 9/233; F21K 9/238; F21Y 2115/10
See application file for complete search history.

(56) References Cited

U.S. PATENT DOCUMENTS

| 9,657,928 B1 * | 5/2017 | Jacobson ................ F21V 23/04 |
| 2017/0171932 A1 * | 6/2017 | Puvanakijjakorn ..... F21V 14/06 |

FOREIGN PATENT DOCUMENTS

CN 201063940 Y * 5/2008

\* cited by examiner

*Primary Examiner* — Henry Luong
(74) *Attorney, Agent, or Firm* — Maier & Maier, PLLC

(57) ABSTRACT

A variable resistance power adjustment device and lamp. The variable resistance power adjustment device includes a mounting base, keycap and resistance adjustment module. The mounting base connecting to the lamp body, working with the lamp body to form a mounting cavity in an enclosure way and provided with a through-hole connecting to the mounting cavity; a keycap connecting to the mounting base flexibly and stretching into the through-hole partially; the resistance adjustment module provided in the mounting cavity, the adjustment part of the resistance adjustment module connecting to the keycap, the resistance adjustment module connects to the driving power supply of the lamp body; the keycap moves to drive the adjustment part of the resistance adjustment module to move, so that the corresponding resistance can be switched into the driving power supply from the resistance adjustment module and the resistance adjustment module adjusts the power of the whole lamp body.

10 Claims, 12 Drawing Sheets

//<br>
VARIABLE RESISTANCE POWER ADJUSTMENT DEVICE AND LAMP

CROSS-REFERENCE TO RELATED APPLICATIONS

This application claims the priority of Chinese Patent Application No. 2020212118024 filed on Jun. 24, 2020, the disclosure of which is incorporated herein by reference.

FIELD

The present disclosure relates to the technical field of lighting equipment, particularly to a variable resistance power adjustment device and a lamp using the variable resistance power adjustment device.

BACKGROUND

Usually, power adjustment of LED lamps requires special light dimmers, such as 0-10V dimmer, controllable silicon dimmer, etc. These dimmers are usually independent from lamps, and the specification of dimmers should match with that of the driving power supply inside LED lamps. Such an operation mode is troublesome, and the circuit is likely to be burnt and accidents are caused when the specification of the dimmer does not match that of the driving power supply.

SUMMARY

The present disclosure mainly aims to provide a variable resistance power adjustment device to simplify the power control mode of lamps and improve the working stability of lamps.

To achieve the objective, the variable resistance power adjustment device of present disclosure is used for adjusting the power of the lamp body. The variable resistance power adjustment device comprises:
the mounting base connecting to the lamp body, working with the lamp body to form a mounting cavity in an enclosure way and provided with a through-hole connecting to the mounting cavity;
  a keycap connecting to the mounting base flexibly and stretching into the through-hole partially; and
  a resistance adjustment module provided in the mounting cavity, the adjustment part of the resistance adjustment module connecting to the keycap, the resistance adjustment module connects to the driving power supply of the lamp body electrically; the keycap rotates or slides to drive the adjustment part of the resistance adjustment module to rotate or slide, so that the corresponding resistance can be switched in the driving power supply from the resistance adjustment module and the resistance adjustment module adjusts the power of the whole lamp body.

In one of the embodiments of the present disclosure, the resistance adjustment module comprises a fixed resistor and a potentiometer, the fixed resistor and the potentiometer switch in the driving power supply of the lamp body in series;
  the adjustment part of the potentiometer connects to the keycap.

In one of the embodiments of the present disclosure, the potentiometer is a knob-type potentiometer;
  the surface of the keycap facing the mounting base is provided with connecting rods which are provided in the through-hole and connects to the knob-type potentiometer.

In one of the embodiments of the present disclosure, the external surface of the mounting base is also provided with limit slots which are provided around the through-hole;
  the surface of the keycap facing the mounting base is provided with a protruding limit post, the limit post and the connecting rod are provided in parallel, and the limit post can be provided in the limit slots in a slide way.

In one of the embodiments of the present disclosure, the external surface of the mounting base is provided with several locating slots which are provided in a circular shape around the through-hole and provided at intervals with the limit slots;
  the surface of the keycap facing the mounting base is provided with a protruding positioning column, the positioning column and the connecting rod are provided in parallel, and positioning column can be provided in the locating slot in a slide way.

In one of the embodiments of the present disclosure, the surface of the mounting base facing the keycap is provided with several locating bars which configured in a radiation shape centering on the through-hole, and two adjacent the locating bars form the locating slot.

In one of the embodiments of the present disclosure, the limit slots are arc slots, the angle between connection lines of two ends of the arc slots and the through-hole is $\alpha$;
  the rotating angle of the potentiometer is $\beta$, and $\alpha \leq \beta$.

In one of the embodiments of the present disclosure, the mounting base comprises:
  a cover plate provided on the lamp body and provided with an offsetting hole; and
  the base provided on the lamp body, working with the lamp body to form the mounting cavity in an enclosure way, provided correspondingly to the offsetting hole, provided with the through-hole and the limit slots exposed to the offsetting hole.

In one of the embodiments of the present disclosure, the mounting base is provided with several identification parts which are provided around the keycap;
  the keycap's surrounding is provided with protruding guiding blocks.

In one of the embodiments of the present disclosure, the surface of the keycap facing the mounting base is provided with fastening parts which are provided at intervals with connecting rods;
  the fastening parts pass through the through-hole and are against the peripheral wall of the through-hole to make the keycap be provided on the mounting base in a dismountable way.

In one of the embodiments of the present disclosure, the external surface of the mounting base is sunken to form a containing groove, the through-hole is provided at the bottom of the containing groove;
  the keycap is contained in the containing groove partially at least.

In one of the embodiments of the present disclosure, the potentiometer is a slide-type potentiometer;

In one of the embodiments of the present disclosure, the resistance adjustment module connects to the primary coil of the transformer of the driving power supply.

The present disclosure also provides a lamp comprising the lamp body and the variable resistance power adjustment device, and the variable resistance power adjustment device is provided at one end of the lamp body.

In one of the embodiments of the present disclosure, the mounting base is made of translucent materials;

the lamp is provided with a luminous lamp panel, the mounting base covers the luminous lamp panel;

and/or, the lamp also comprises a wire conduit provided on the lamp body and connecting to the mounting cavity of the base;

and/or, the lamp body comprises a lamp cap, a heat dissipation rack and several luminous modules, the lamp cap is provided with a driving power supply, the heat dissipation rack is provided on the lamp cap, the surrounding of the heat dissipation rack is provided with mounting slots, one the luminous module is provided in one the mounting slot and connects to the driving power supply of the lamp cap.

In the technical scheme of this present disclosure, the lamp body provided with a mounting base where the keycap and the resistance adjustment module are installed, so that the resistance adjustment module can change the value of resistance switched in the driving power supply of the lamp body and then the luminescence power of the lamp body is change. Wherein, the resistance adjustment module also comprises a knob-type potentiometer or a slide-type potentiometer, that is, the user can make the keycap slide in the through-hole to adjust the value of resistance switched in the driving power supply from the resistance adjustment module; or, the user can rotate the keycap to make the keycap rotate in the through-hole to adjust the value of resistance switched in the driving power supply from the resistance adjustment module. The variable resistance power adjustment device of present disclosure simplifies the power control mode of the lamp, reduces the power adjustment cost and improves the working stability of the lamp. In addition, the adjustment device is directly provided on the lamp body, so the power of the lamp body can be set before installation of the lamp body without being powered on. The adjustment process is simple, convenient and safe. The present disclosure is applicable for the unity of specifications of lamp bodies, so the user only needs to buy one product and adjusts the variable resistance power adjustment device during use to meet power demands in different lighting scenes.

BRIEF DESCRIPTION OF THE DRAWINGS

To better describe the technical schemes of the embodiments of present disclosure or prior art, a brief introduction of FIG. to be used in the descriptions of the embodiment or prior art is made hereby. Obviously, the Attached Figure described below is only several embodiments of the present disclosure. For common technicians in this field, they can obtain other attached figures. Based on these structures shown in the attached figure. without making additional creative endeavors.

DETAILED DESCRIPTION

Combined with the Attached Figure in the embodiments of the present disclosure, to clearly and completely describe the technical scheme of the embodiments of present disclosure. Obviously, only part of the embodiments of present disclosure (instead of all of the embodiment) are described here. Based on the embodiments of the present disclosure, all other embodiments acquired by the common technicians in this field without creative work, shall be in the protection scope of the present disclosure.

It should be noted that, if there is a directional indication (upper, lower, left, right, front, and rear, etc.) in the embodiments of the present disclosure, the directional indication is only used to explain the relative positional relationship, motion condition, etc. between the components in a particular position (as shown in the Attached Figure), and if the particular attitude is changed, the directional indication is changed accordingly.

In addition, if there are descriptions relating to "first", "second" and the like in the embodiments of the present disclosure, such descriptions of "first", "second" and the like are for descriptive purposes only and are not to be construed as indicating or implying their relative importance or implying an indication of the number of indicated technical features. As such, a feature that defines as "first", "second" may explicitly or implicitly include at least one of that features. In addition, the "and/or" as stated in the whole text should be understood as there are three paralleled schemes where scheme A, or scheme B or scheme A and scheme B can be met at the same time (taking "A and/or B as an example"). In addition, the technical schemes of embodiments may be combined with each other, but must be available for common technicians in this field, and when the combination of the technical scheme is contradictory or impossible, it should be considered that the combination of the technical scheme does not exist and not fall within the scope of the present disclosure.

Figure 1:
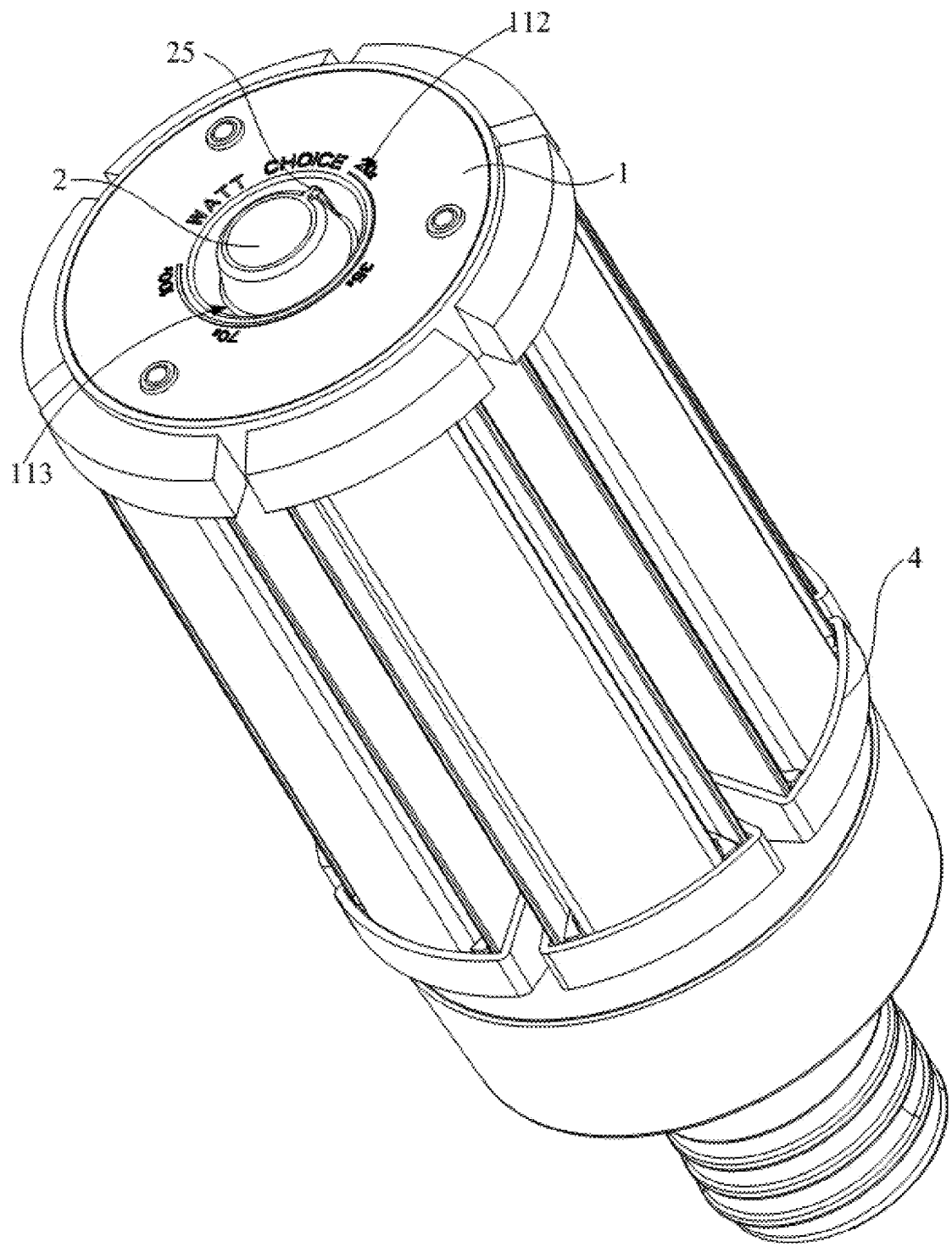
FIG. 1 is a schematic diagram showing the structure of an embodiment of the variable resistance power adjustment device of present disclosure.
Figure 2:
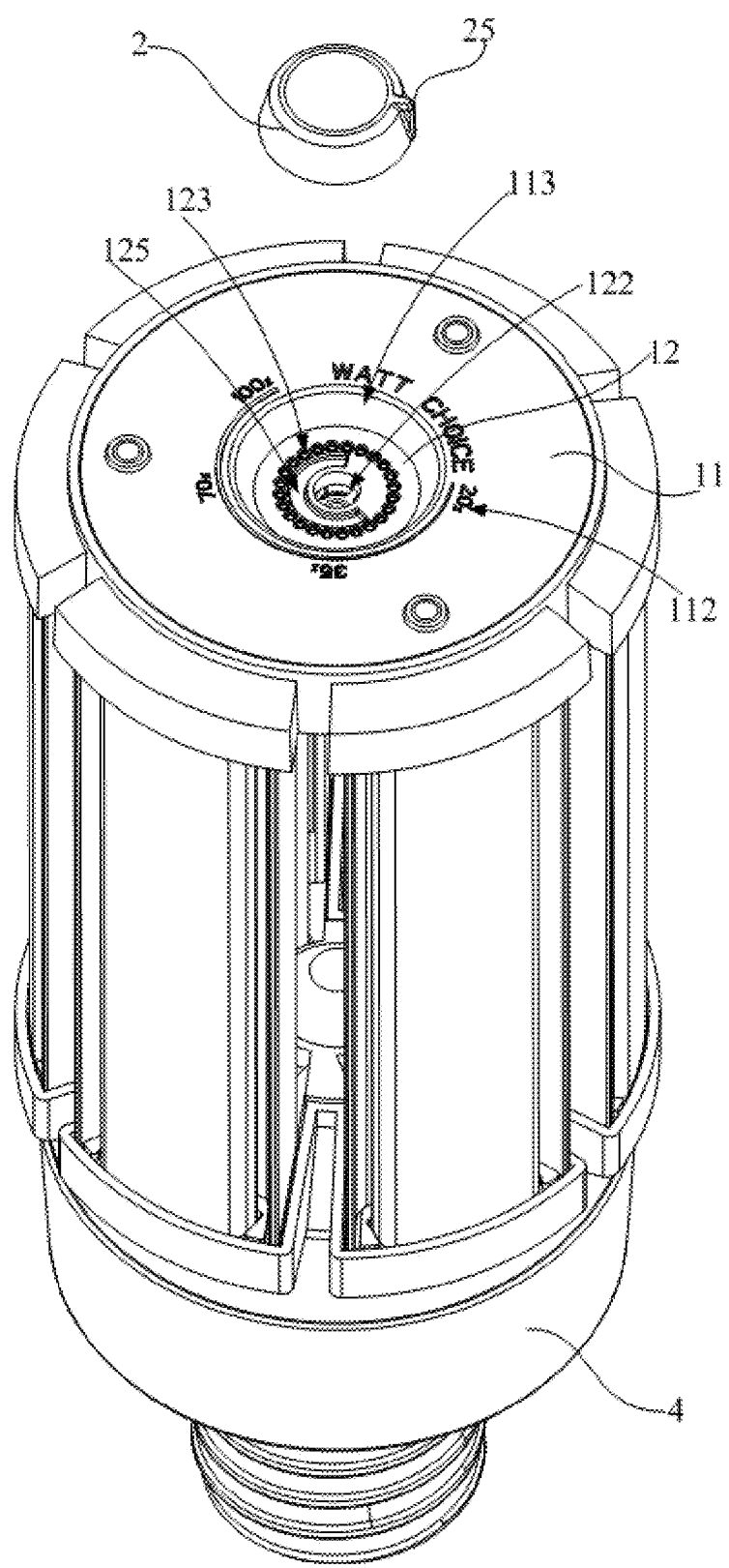
FIG. 2 is a schematic diagram showing the assembly structure of the variable resistance power adjustment device in FIG. 1.
Figure 3:
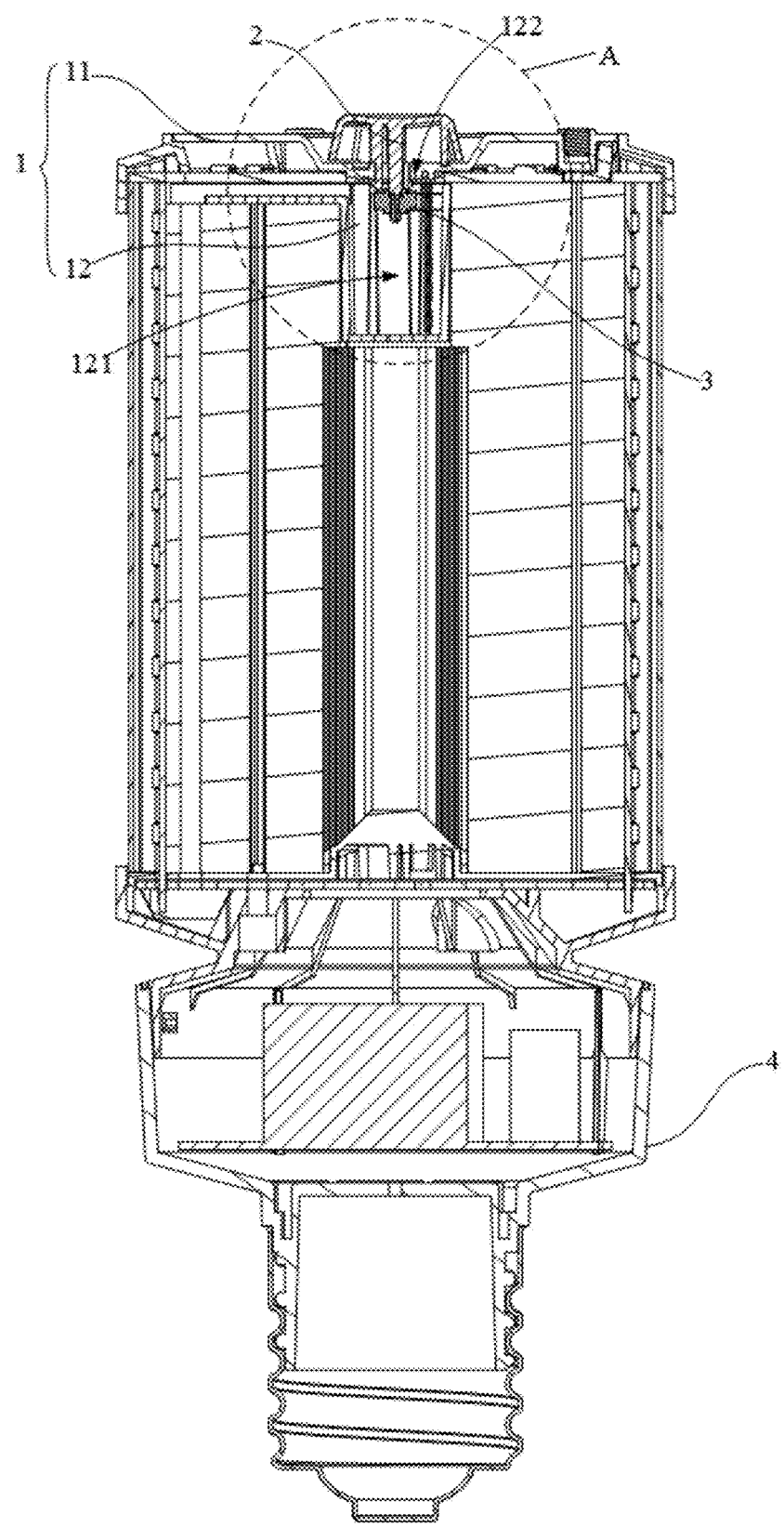
FIG. 3 is a schematic diagram showing the sectional structure of the variable resistance power adjustment device in FIG. 2.
Figure 4:
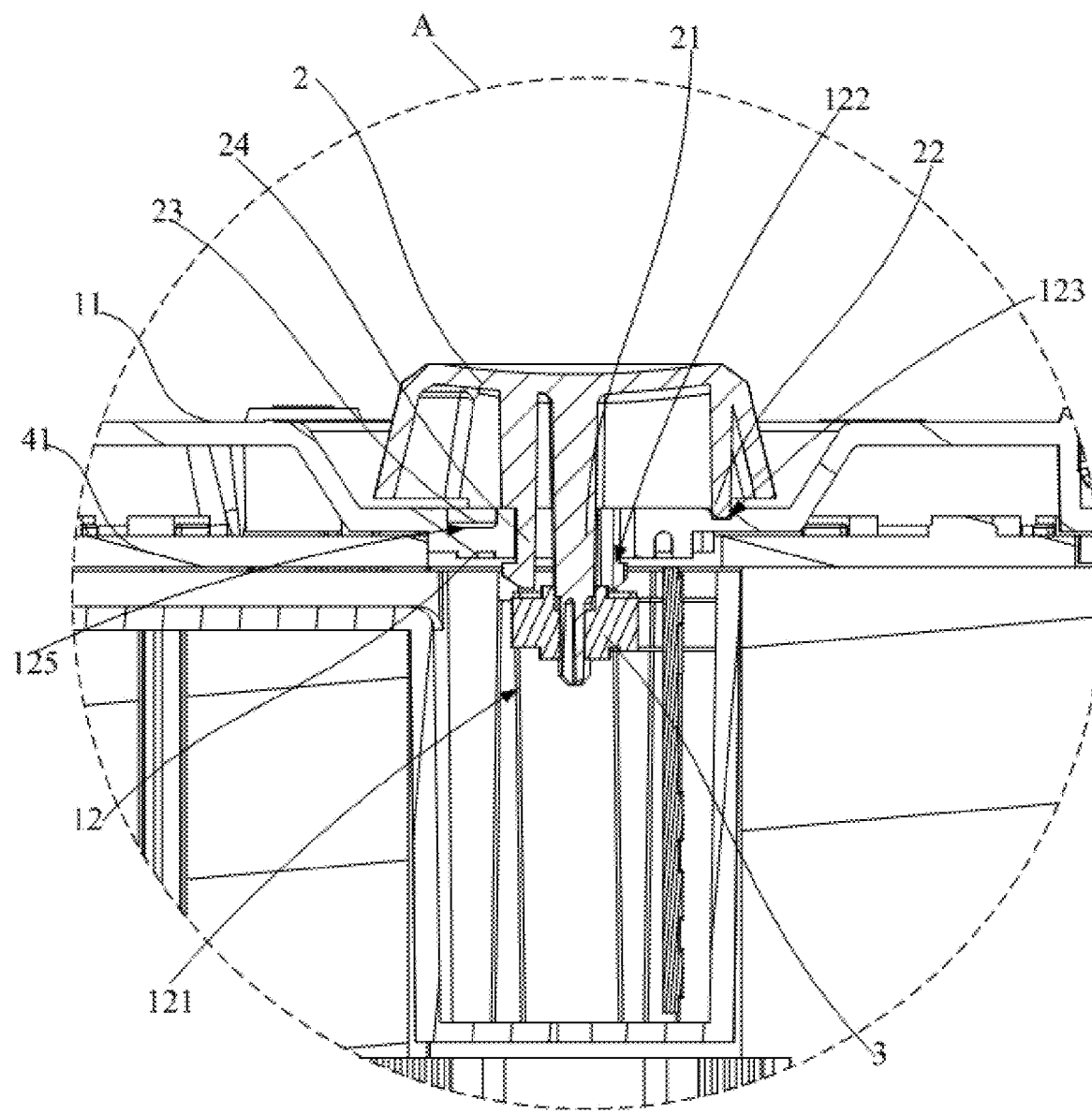
FIG. 4 is a partial enlarged FIG. of section A in FIG. 3.
Figure 5:
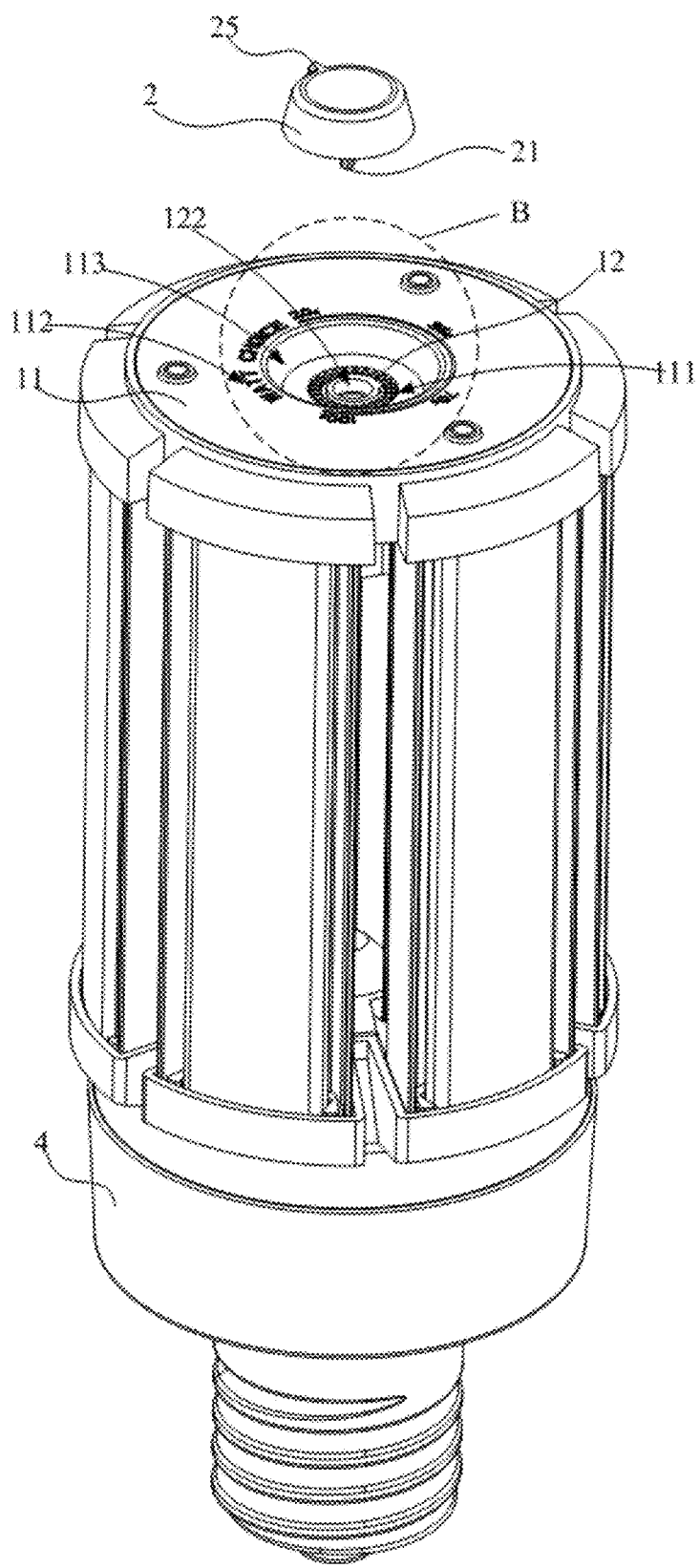
FIG. 5 is a schematic diagram showing the structure of another embodiment of the variable resistance power adjustment device of present disclosure.
Figure 6:
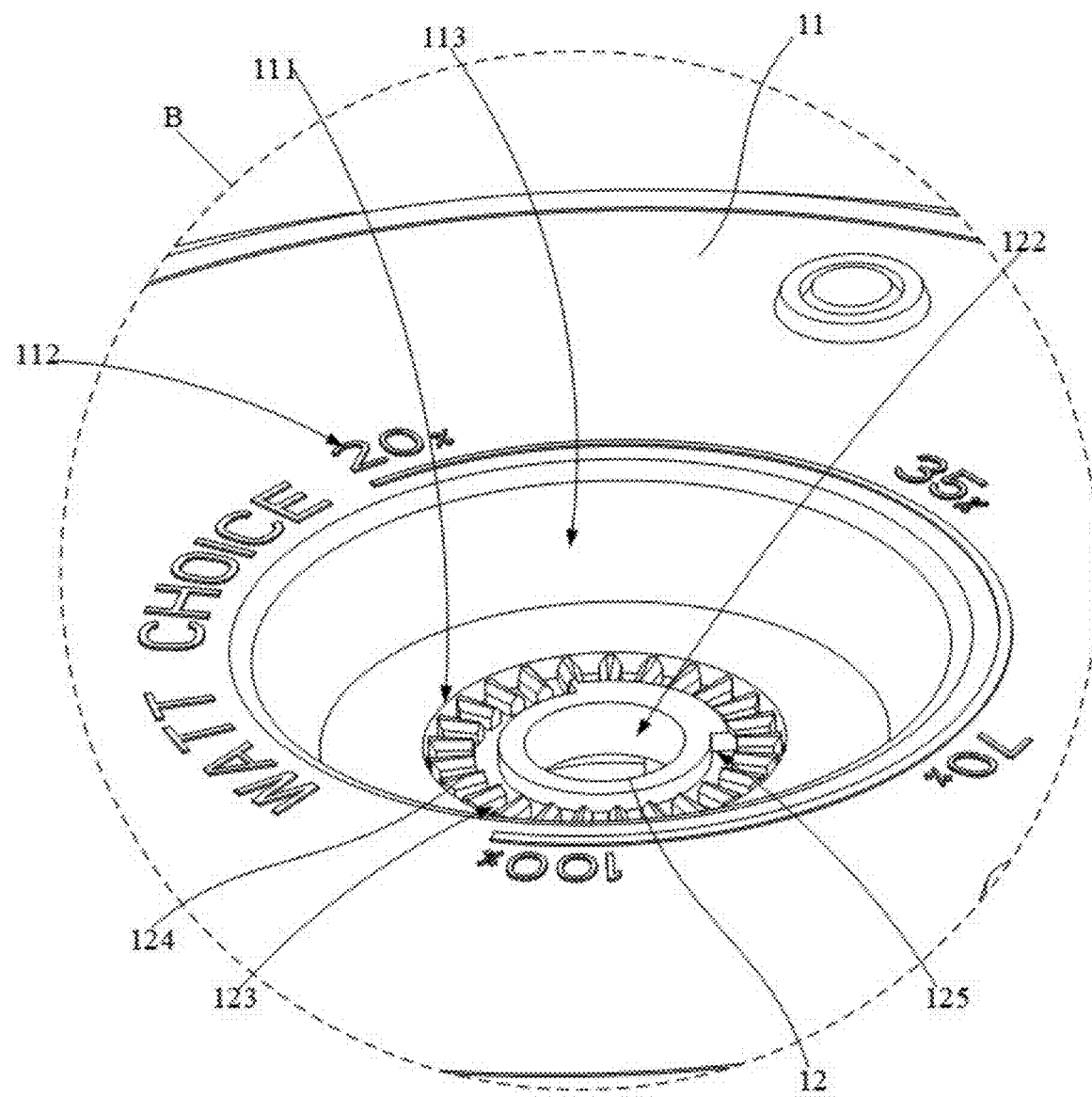
FIG. 6 is a partial enlarged FIG. of section B in FIG. 5.
Figure 7:
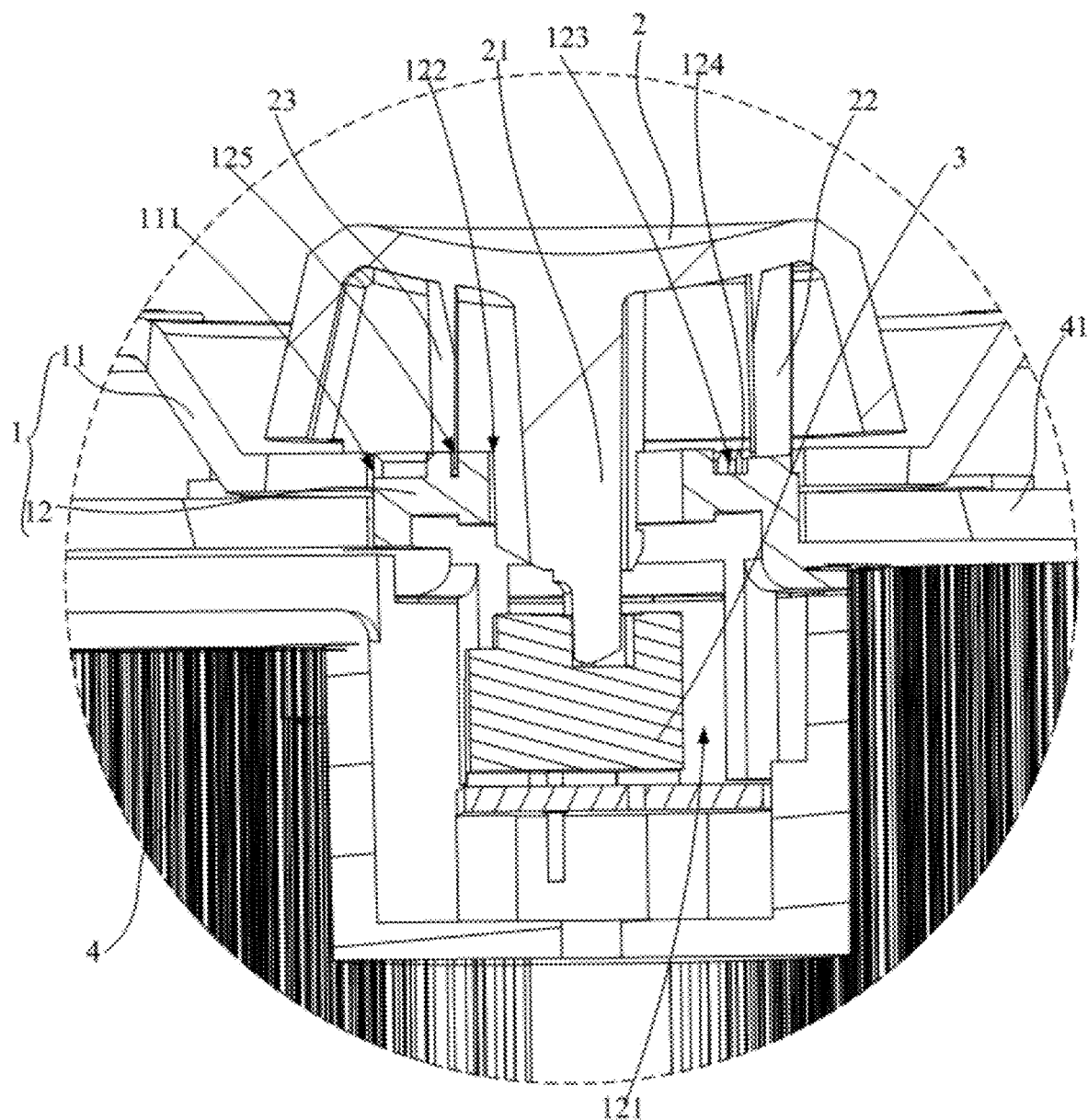
FIG. 7 is a schematic diagram showing the sectional structure of the variable resistance power adjustment device in FIG. 5.
Figure 8:
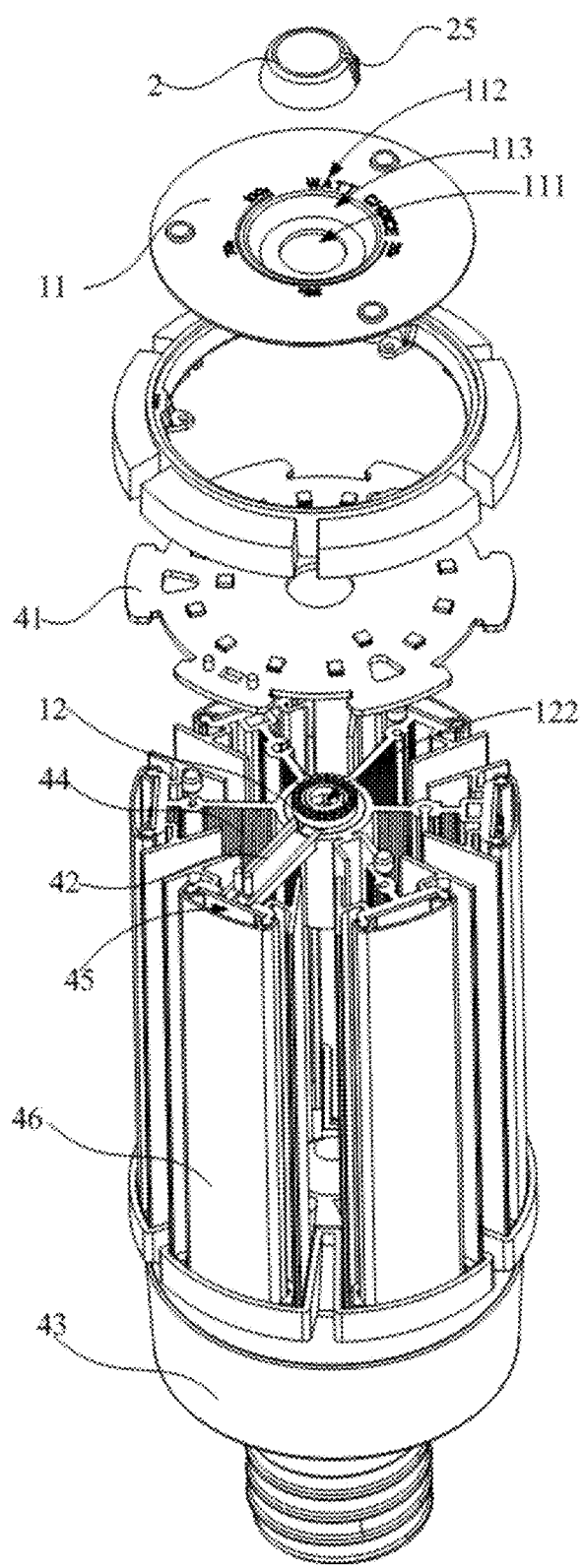
FIG. 8 is a schematic diagram showing the assembly structure of the variable resistance power adjustment device in FIG. 5.
Figure 9:
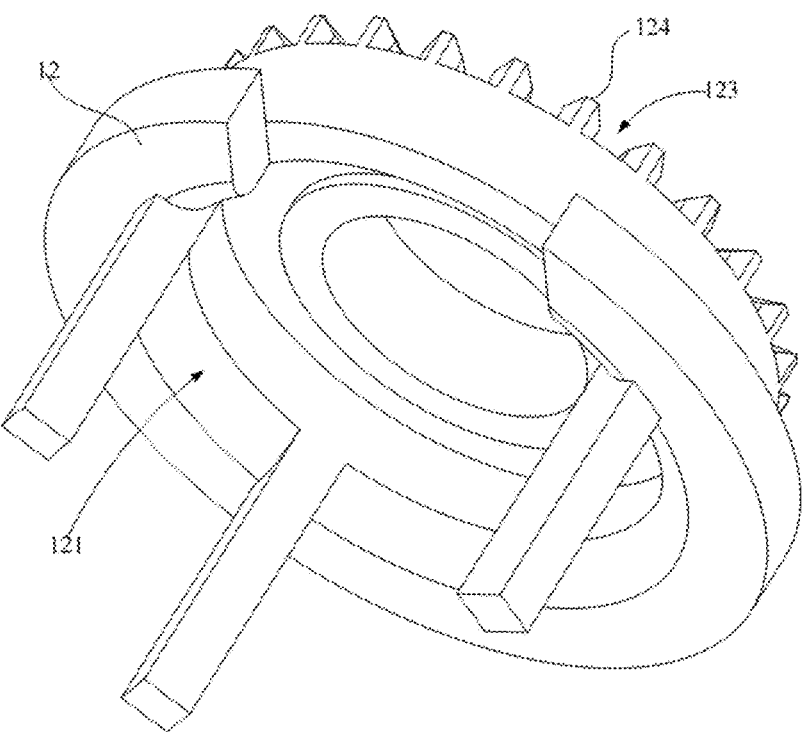
FIG. 9 is a schematic diagram showing the structure of base in FIG. 5.
Figure 10:
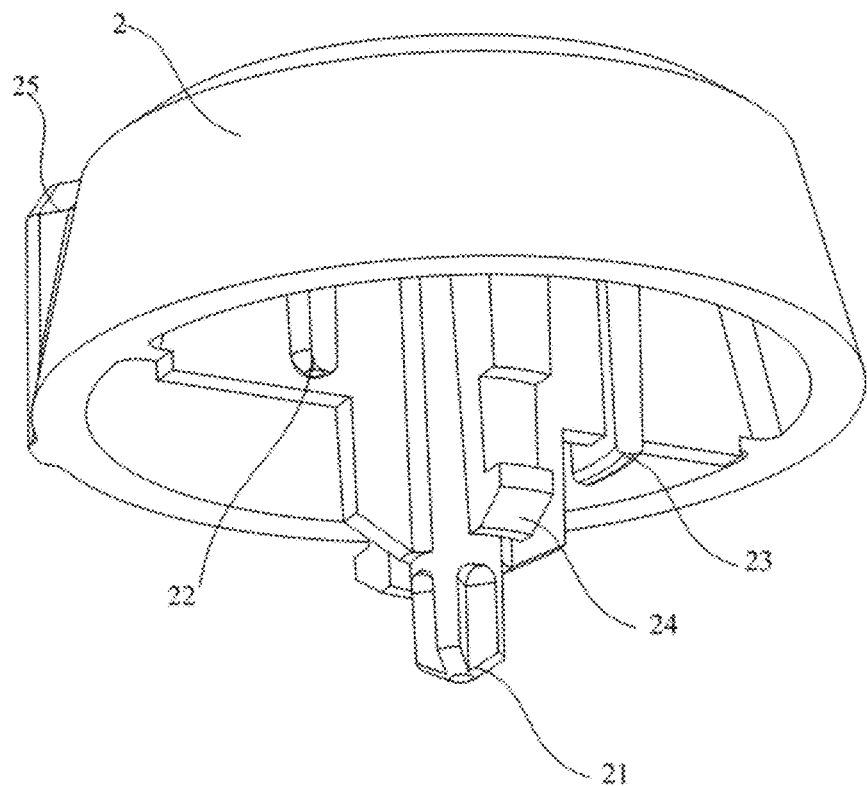
FIG. 10 is the structural diagram of showing the structure of keycap of present disclosure.
Figure 11:
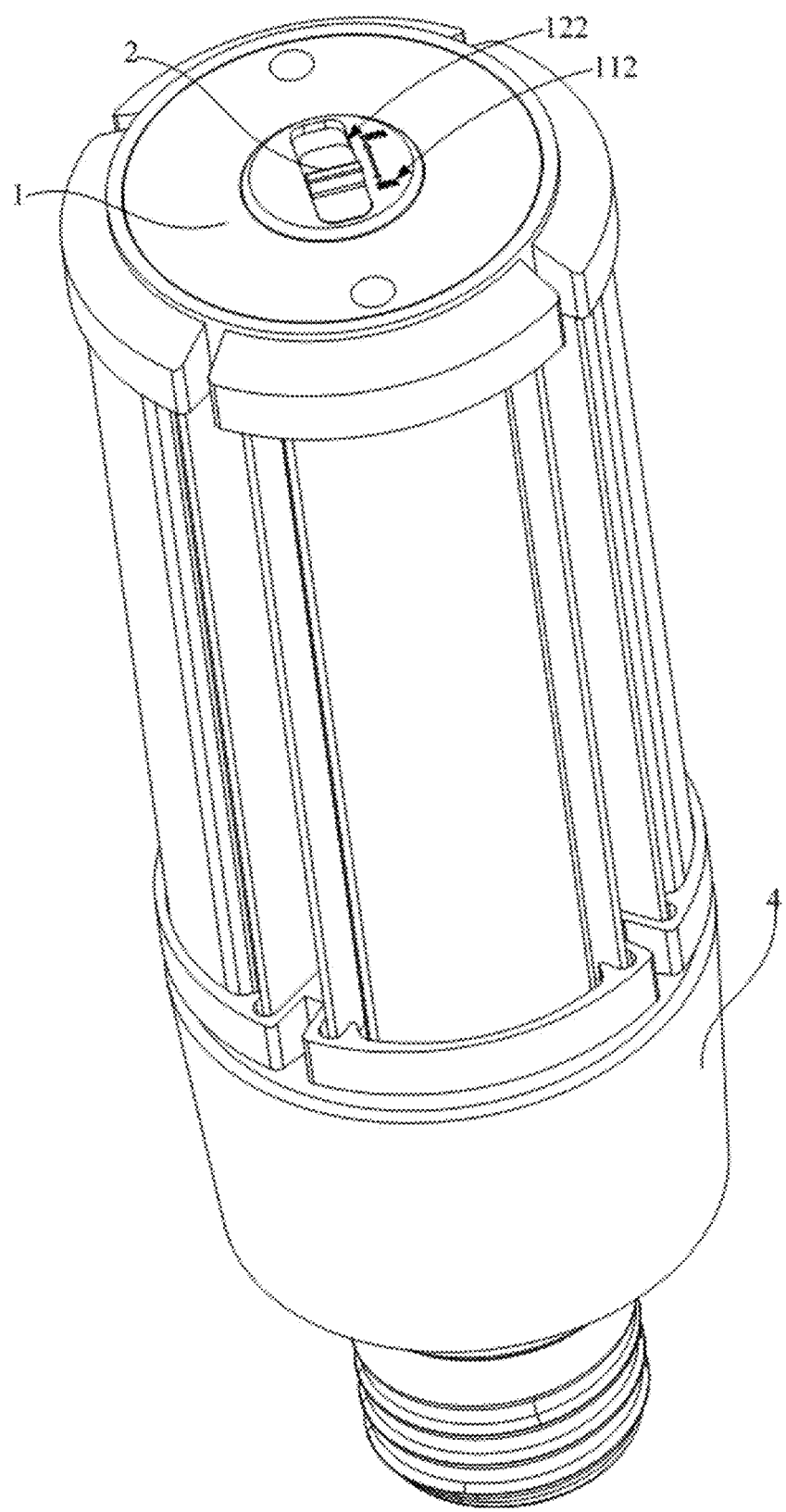
FIG. 11 is a schematic diagram showing the structure of a third embodiment of the variable resistance power adjustment device of present disclosure.
Figure 12:
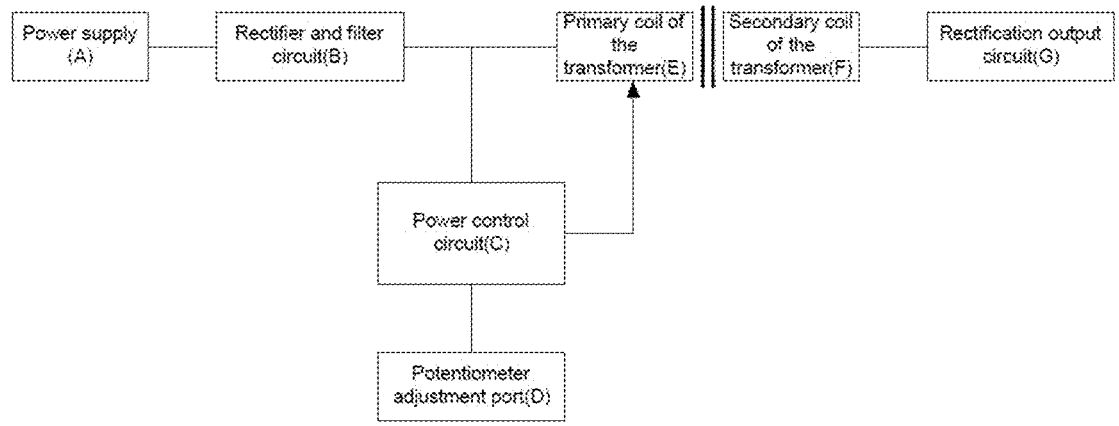
FIG. 12 is a schematic diagram of the circuit module of the lamp of present disclosure.
Figure 13:
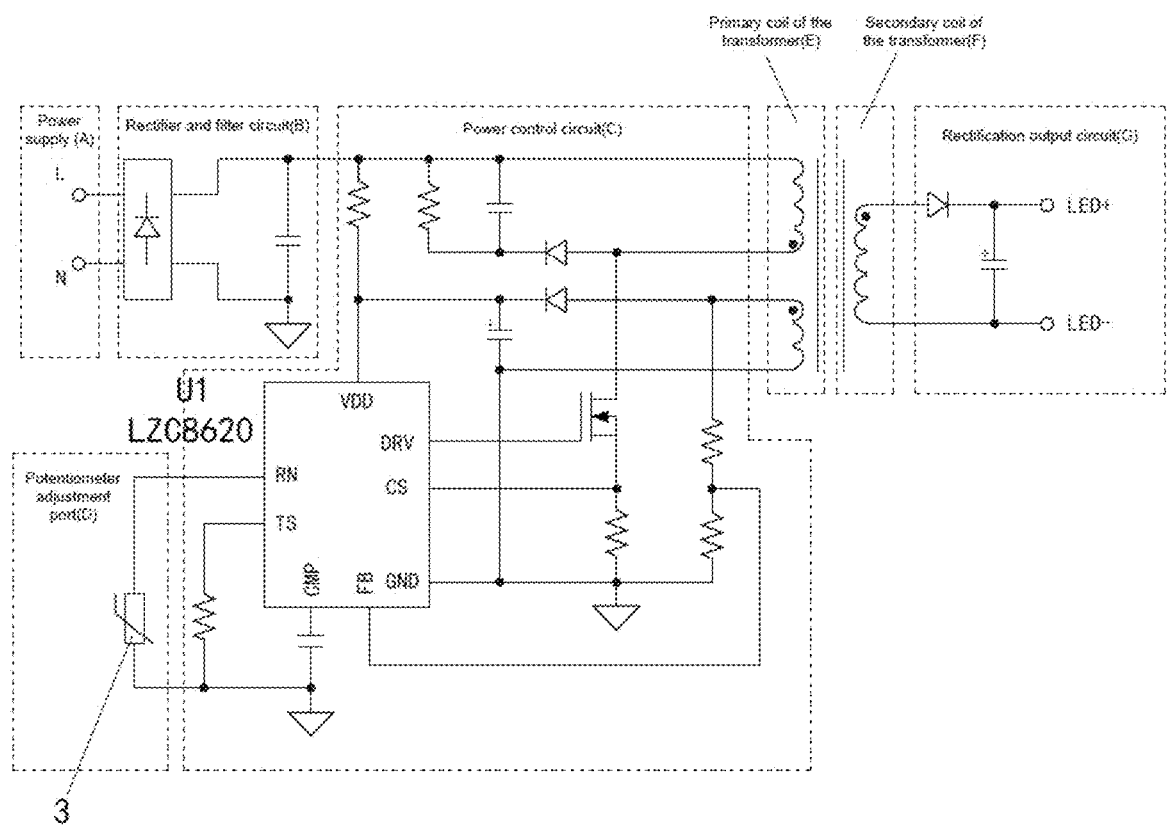
FIG. 13 is a brief schematic diagram of the circuit module in FIG. 12.
Figure 14:
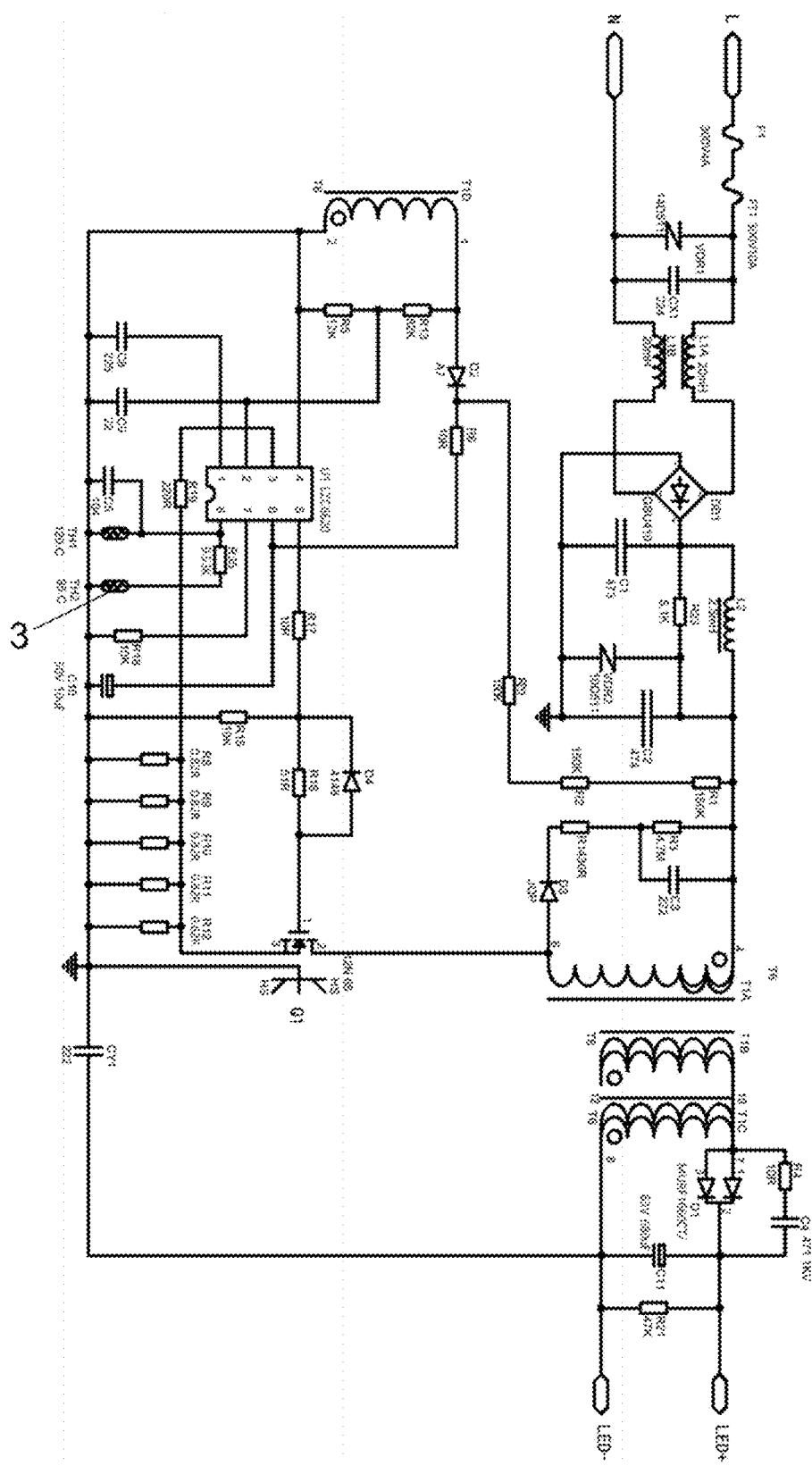
FIG. 14 is a schematic diagram of the overall circuit of the circuit module in FIG. 13.

The present disclosure discloses a variable resistance power adjustment device. Reference FIG. 1 is a schematic diagram showing the structure of an embodiment of the variable resistance power adjustment device of present disclosure; Reference FIG. 2 is a schematic diagram showing the assembly structure of the variable resistance power adjustment device in FIG. 1; Reference FIG. 3 is a schematic diagram showing the sectional structure of the variable resistance power adjustment device in FIG. 2; Reference FIG. 4 is a partial enlarged FIG. of section A in FIG. 3; Reference FIG. 5 is a schematic diagram showing the structure of another embodiment of the variable resistance power adjustment device of present disclosure; Refer to FIG. 6 for the partial enlarged FIG. of section B in FIG. 5; Reference FIG. 7 is a schematic diagram showing the sectional structure of the variable resistance power adjustment device in FIG. 5; Reference FIG. 8 is a schematic diagram showing the assembly structure of the variable resistance power adjustment device in FIG. 5; Reference FIG. 9 is a schematic diagram showing the structure of base in FIG. 5; Reference FIG. 10 is the structural diagram of showing the structure of keycap of present disclosure; Reference FIG. 11 is a schematic diagram showing the structure of a third embodiment of the variable resistance power adjustment device of present disclosure; Reference FIG. 12 is a schematic diagram of the circuit module of the lamp of present disclosure; Reference FIG. 13 is a brief schematic diagram of the circuit module in FIG. 12; Reference FIG. 14 is a schematic diagram of the overall circuit of the circuit module in FIG. 13.

In the embodiments of the present disclosure, as shown in FIG. 1 and in combination with FIG. 2, FIG. 3, FIG. 4, FIG. 5 and FIG. 11, the variable resistance power adjustment device is used for adjusting the power of the lamp body 4. The variable resistance power adjustment device compromises: mounting base 1, keycap 2 and resistance adjustment module. Mounting base 1 is fixed to the lamp body 4, working with the lamp body 4 to form a mounting cavity 121 in an enclosure way, mounting base 1 is provided with a through-hole 122 connecting to the mounting cavity 121; the keycap 2 connects to the mounting base 1 flexibly and stretches into the through-hole 122 partially; resistance adjustment module is provided in the mounting cavity 121, the adjustment part of the resistance adjustment module connects to the keycap 2, and the resistance adjustment module connects to the driving power supply of the lamp body 4 electrically.

In the practical application of this embodiment, the user can make the keycap 2 rotate or slide to drive the adjustment part of the resistance adjustment module rotate or slide, so that the corresponding resistance can be switched in the driving power supply from the resistance adjustment module and the resistance adjustment module adjusts the power of the lamp body 4. Wherein, the adjustment part of the resistance adjustment module refers to the flexible switch on the resistance adjustment module. For example, the resistance adjustment module comprises a knob-type potentiometer, and the adjustment part refers to the knob switch on the knob-type potentiometer. The knob switch connects to the keycap 2, rotation of the keycap 2 will drive the knob switch to rotate, so that certain resistance is switched in the driving power supply of the lamp body 4 directly from the knob-type potentiometer.

Understandably, the through-hole 122 passes through two surfaces of the mounting base 1, and the through-hole 122 can be a circular or rectangular hole. When the through-hole 122 is a circular hole, the resistance adjustment module can comprise a knob-type potentiometer, the keycap 2 connects to the adjustment part of the knob-type potentiometer, the keycap 2 rotates in the through-hole 122 to adjust the value of resistance switched in the driving power supply from the knob-type potentiometer, so that the luminescence power of the lamp body 4 is adjusted; When the through-hole 122 is a circular hole, the resistance adjustment module can comprise a slide-type potentiometer 3, the keycap 2 connects to the adjustment part of the knob-type potentiometer, the keycap 2 rotates in the through-hole 122 to adjust the value of resistance switched in the driving power supply from the knob-type potentiometer, so that the luminescence power of the lamp body 4 is adjusted.

In the embodiments of utility mode, the lamp body 4 provided with a mounting base 1 where the keycap 2 and the resistance adjustment module are installed, so that the resistance adjustment module can change the value of resistance switched in the driving power supply of the lamp body 4 and then the luminescence power of the lamp body is changed. Wherein, the resistance adjustment module also comprises knob-type potentiometer or a slide-type potentiometer 3, that is, the user can make the keycap 2 slide in the through-hole 122 to adjust the value of resistance switched in the driving power supply from the resistance adjustment module; or, the user can rotate keycap 2 to make it rotate in the through-hole 122 to adjust the value of resistance switched in the driving power supply from the resistance adjustment module. The variable resistance power adjustment device of present disclosure simplifies the power control mode of the lamp and improves the working stability of the lamp.

In the practical application of this embodiment, in combination with FIG. 4, the mounting base 1 can be provided on lamp body 4 in a clamping way; or the mounting base 1 can be fixed to the lamp body 4 with screws. Wherein, when the mounting base 1 is installed to the lamp body 4, there is a space between the partial area of the mounting base 1 and the lamp body 4, forming the mounting cavity 121; in other words, the mounting base 1 can be a plane structure, the lamp body 4 is provided with a concave slot, when the mounting base 1 is installed to the lamp body 4, the mounting base 1 covers the concave slot to form the mounting cavity 121; or, the mounting base 1 is provided with a concave slot, the surface of the lamp body 4 facing the mounting base 1 can be a plane structure, when the mounting base 1 is installed to the lamp body 4, the mounting base 1 works and the lamp body 4 form the mounting cavity 121 in an enclosure way.

Based on the afore the contents, the mounting base 1 works and the lamp body 4 to form the mounting cavity 121 in an enclosure way, and to facilitate installation of the keycap 2, the through-hole 122 is provided correspondingly to the mounting cavity 121; in other words, the through-hole 122 passes through the opposite two surfaces of the mounting base 1, so that the resistance adjustment module is provided in the mounting cavity 121 and is exposed to the through-hole 122 partially, the keycap 2 can pass through the through-hole 122, and the part of the keycap 2 passing through the through-hole 122 connects to the adjustment part of the resistance adjustment module.

In the practical application of this embodiment, in combination with FIG. 4, the keycap 2 connects to the mounting base 1 flexibly, which means that: the surface of the keycap 2 facing the mounting base 1 is provided with a protruding fastening part 24, the fastening part 24 of the keycap 2 passes through the through-hole 122, so that the fastening part 24 fits the button stand on the internal wall of the keycap 2 and the keycap 2 can rotate or slide in the through-hole 122; or the periphery of the keycap 2 is provided with protruding parts, the mounting base 1 is provided with limit slots 125, and protruding parts can be provided in the limit slots 125 in a slide way.

In one of the embodiments of the present disclosure, the resistance adjustment module comprises a fixed resistor and potentiometer 3, fixed resistor and potentiometer 3 are switched in the driving power supply of the lamp body 4 in series, and the adjustment part of potentiometer 3 connects to the keycap 2. Understandably, when the value of resistance switched in the driving power supply from the potentiometer 3 is 0, only the fixed resistor is switched in the driving power supply to adjust the current passing through the fixed resistor and the potentiometer 3, and, in such a way, the fixed resistor and the potentiometer 3 serve as the component of adjusting the luminescence power of the lamp body 4 to improve the accuracy of the luminescence power of the lamp body 4.

Understandably, in combination with FIG. 12, FIG. 13 and FIG. 14, the fixed resistor and the potentiometer 3 connect in series as a whole. After the fixed resistor and the potentiometer 3 connect in series, they connect to the luminous module 46 of the lamp body 4 in parallel, i.e., the luminous module 46 connects to the fixed resistor and the potentiometer 3 in parallel and then is switched in the driving power supply.

Optionally, the fixed resistors resistance can be any numerical value. For example, the resistance of fixed resistor could be 5Ω, 10Ω, 15Ω, etc. Of course, the resistance of the fixed resistor can also be adjusted according to the actual industrial design.

Optionally, the resistance of the potentiometer 3 can be 0Ω-2 kΩ.

Optionally, the resistance of the potentiometer 3 can be 0Ω-2 kΩ. When the luminescence power of the lamp body 4 is adjustable, the potentiometer 3 with a corresponding resistance range can be replaced as needed.

In the practical application of this embodiment, the fixed resistor and the potentiometer 3 are connected in series and then are switched in the driving power supply of the lamp body 4, so that the luminescence power of the luminous module 46 can be adjusted by using the fixed resistor and the potentiometer 3 to improve the corresponding precision of the resistance and adjustment parameter.

Specifically, for the afore the fixed resistor and the potentiometer 3 switched into the driving power supply, it can be understood as:

assuming that the resistance of the knob-type potentiometer is 0Ω-2 kΩ, the designed rated rotating angle range of the knob switch of the knob-type potentiometer is 0°-240°; wherein, when the adjustment angle of the knob switch of the knob-type potentiometer is 0° or 240°, the adjustment angle 0° is corresponding to 0Ω, and the adjustment angle 240° is corresponding to 2 kΩ, and, between 0°-240°, the value of resistance switched into the driving power supply gets bigger gradually.

In the practical application, when the knob-type potentiometer is applied to the driving power supply, not all the corresponding light adjustment effect between the adjustment range of 0° and 240° could be generated, but the light adjustment effect is good. Its working characteristics include: for the potentiometer within a low resistance range, the light adjustment sensitivity is too high, the power declines or rises too quickly, and flashing is likely to happen; within a high resistance range, the light adjustment sensitivity is too low, the power hardly changes when the resistance value is changed, and the luminance of the lamp is not obvious; within a middle resistance range, the light adjustment effect is good, and the power adjustment precision is high. For example: Usually, the adjustment angle of the knob switch of the knob-type potentiometer is 30°-210°, and its resistance value change within this range is suitable for power adjustment of the lamp body 4. The user can rotate the keycap 2 to realize rotation of the knob switch of the knob-type potentiometer within 30°-210°;

However, in actual situations, the range of the power of the lamp body 4 to be adjusted is certain, such as 20%-100%. When the adjustment angle of the potentiometer 3 is 30°, if the rotation angle is small, the actual resistance change of the potentiometer 3 is small, the power changes too fast, the power adjustment sensitivity is too high, as a result, the power of the lamp body 4 does not maintain 20%, and the actual power may be 15%. Therefore, the potentiometer 3 is provided with a fixed resistor in series, so the cooperation between the fixed resistor and the potentiometer 3 makes the overall resistance maintain a medium resistance range, improving the power adjustment precision; in addition, through the setting of the specification of the fixed resistor, the power of the lamp is just 20% when the adjustment angle of the potentiometer 3 is 30°. Compared with the application of the single potentiometer 3, the cooperation of the fixed resistor and the potentiometer 3 can improve the adjustment sensitivity.

So, the fixed resistor can work with the knob-type potentiometer to correct power. Through switching the fixed resistor (as a reference value) into the driving power supply, the potentiometer 3 with a small resistance value can be applied instead of a large resistance value, effectively reducing the production cost and improving the stability of the adjustment system.

In combination with FIG. 12, FIG. 13 and FIG. 14, the variable resistance power adjustment device can be switched into the primary coil of the transformer of the driving power supply or the secondary coil of the transformer of the driving power supply. Wherein, the principle of the solution is explained by taking the switch of the variable resistance power adjustment device in the primary coil of the transformer of the driving power supply as an example. Specific contents are as follows:

In combination with FIG. 12 and FIG. 13, when the resistance adjustment module connects to one end of the primary coil of the transformer of the driving power supply, it can be avoided that another resistance adjustment module set on the secondary coil of the transformer, achieving a simple circuit structure and lowering the cost. When the external power supply end is switched into the alternating current, after filtering by the rectifier, the primary coil and the secondary coil of the transformer convert voltage into that needed in working of the luminous module 46, the alternating current is converted into the direct current needed in working of the luminous module 46 through the rectifying circuit, and there is a power control circuit between the filtering circuit of the driving power supply and the transformer to control the output power of the driving power supply. In other words, the potentiometer of the variable resistance power adjustment device connects to the adjustment interface of the power control circuit of the driving power supply.

In combination with FIG. 13 and FIG. 14, U1 chip in this embodiment can be a regular chip. For example, Chip LZC8620. Specifically, the RN port of U1 chip connects to the potentiometer to coordinate with U1 chip to adjust the control mode of the primary coil of the transformer and then adjust the output power of the driving power supply.

In regular circuits, the power may be adjusted by connecting a thermistor to the driving power supply. In such a way, the control precision is low, and the power cannot be adjusted effectively. Or the driving power supply can be provided with several control circuits, but it will cause a high cost, and products are very complex and cannot be manufactured effectively. In this embodiment, by switching the resistance adjustment module in the driving power supply in this embodiment, the luminescence power of the lamp body can be controlled effectively, and the control precision is high.

As shown in the following FIG. 14, this is a schematic diagram of the circuit of a complete embodiment. Wherein, TH2 is potentiometer 3 whose resistance is 0-2 KΩ; R35 is a fixed resistor (9.53 KΩ) connecting to TH2 in series and used for adjusting the minimum power of the lamp.

In one of the embodiments of the present disclosure, in combination with FIG. 3, FIG. 4, FIG. 5, FIG. 6 and FIG. 7, the potentiometer 3 is a knob-type potentiometer; the surface of the keycap 2 facing the mounting base 1 is provided with connecting rod 21 which passes through the through-hole 122 and connects to the knob-type potentiometer.

In this embodiment, the mounting wall is provided with a knob-type potentiometer inside, by which the mounting base 1 only needs to be provided with a rectangular or circular through-hole 122, avoiding that the through-hole 122 covers a large area of the mounting base 1 and improving the external compactness of the variable resistance power adjustment device. In another aspect, the keycap 2 is used for rotating the knob-type potentiometer to adjust the resistance switched on the driving power supply, achieving high adjustment flexibility.

In one of the embodiments of the present disclosure, in combination with FIG. 2 and FIG. 6, the external surface of the mounting base 1 is also provided with limit slot 125 which is provided around the through-hole 122.

In combination with FIG. 10, the surface of the keycap 2 facing the mounting base 1 is provided with limit post 23 which is in parallel with connecting rod 21, and limit post 23 can be provided in limit slot 125 in a slide way.

In this embodiment, the external surface of the mounting base 1 is also provided with limit slot 125, the keycap 2 is provided with limit post 23 corresponding to limit slot 125, limit post 23 can be provided in limit slot 125 in a slide way to limit rotation angles of the keycap 2 and avoid damage to the potentiometer 3 caused by excessive rotation of the keycap 2.

In one of the embodiments of the present disclosure, in combination with FIG. 2 and FIG. 6, the external surface of the mounting base 1 is also provided with several locating slots 123 which are set around the through-hole 122 in a circle, and several locating slots 123 and limit slot 125 are provided at intervals;

In combination with FIG. 10, the surface of the keycap 2 facing the mounting base 1 is provided with positioning column 22 which are in parallel with connecting rod 21, and positioning column 22 can be provided in locating slots 123 in a slide way.

In this embodiment, the external surface is also provided with several locating slots 123 which are set around the through-hole 122 in a circle, the keycap 2 is provided with positioning column 22 corresponding to several locating slots 123. Wherein the keycap 2 rotates, the locating post 22 moves from one locating slot 123 to another locating slot 123. During this process, the internal wall of several locating slots 123 plays an impediment role in the motion of the locating post 22, avoiding damage to the potentiometer 3 caused by too fast rotation of the keycap 2.

Optionally, several locating slots 123 and limit slots 125 are provided around the through-hole 122 partially or wholly, several locating slots 123 and limit slots 125 are provided at intervals, i.e., the circumference of several locating slots 123 and that of limit slot 125 are set at intervals.

Understandably, in combination with FIG. 2 and FIG. 6, the locating slots 123 can be slot formed through the sinking of the mounting base 1. Or, the mounting base 1 can be provided with several locating bars 124, and two adjacent locating bars 124 work to form locating slots 123.

In one of the embodiments of the present disclosure, two adjacent the locating bars 124 provided at intervals to form locating slots 123, in combination with FIG. 6, FIG. 7 and FIG. 9, the surface of the mounting base 1 facing the keycap 2 is provided with several locating bars 124 which are provided in a radiation shape centering on the through-hole 122.

In this embodiment, a structure characterized in that several locating bars 124 form several locating slots 123 are applied to enhance the thickness of locating slots 123, so that the service life of the variable resistance power adjustment device can be improved.

In one of the embodiments of the present disclosure, limit slots 125 are provided in an arc shape, the angle between connection lines of two ends of limit slot 125 and the through-hole 122 is $\alpha$, the rotating angle of the potentiometer 3 is $\beta$, and $\alpha \leq \beta$. In other words, the length of the limit slot 125 is no more than the stroke of rotation of the potentiometer 3 driven by the keycap 2, avoiding damage to the potentiometer 3.

In another aspect, the other important reason of $\alpha \leq \beta$ is: regular potentiometers can hardly realize even light adjustment within it resistance adjustment range; in other words, for the potentiometer within a low resistance range, the light adjustment sensitivity is too high, flashing is likely to happen, and the performance is unstable; when the potentiometer is adjusted within a high resistance range, the light adjustment sensitivity is too low, the power hardly changes when the resistance value is changed, and the luminance of the lamp is not obvious; i.e., for the potentiometer within a medium resistance range, the light adjustment effect is good. So, the deficiency of the adjustment precision difference needs to be overcome through structural design of the adjustment device. By selecting a medium adjustment angle $\gamma$ of the potentiometer with a certain light adjustment effect and making any in structure design, the potentiometer will be limited to rotating only within an angle range which can achieve a good light adjustment effect, ensuring that the light adjustment effect is good within the whole rotation range of the keycap.

In one of the embodiments of the present disclosure, in combination with FIG. 5, FIG. 6, FIG. 7, FIG. 8 and FIG. 9, the mounting base 1 comprises the cover plate 11 and the base 12. Wherein, the cover plate 11 is provided on the lamp body 4, and the cover plate 11 is provided with offsetting hole 111; The base 12 is provided on the lamp body 4 and works with the lamp body 4 to form a mounting cavity 121 in an enclosure way, the base 12 is provided corresponding to the offsetting hole 111, the base 12 is provided with a through-hole 122 and limit slot 125, and the through-hole 122 and the limit slot 125 is exposed to the offsetting hole 111.

In this embodiment, there is a cover plate 11 and base 12 corresponding to the mounting base 1. In other words, the cover plate 11 and the base 12 are independently provided, base 12 is provided on the lamp body 4, and then the cover plate 11 covers the lamp body 4, the cover plate 11 is provided with an offsetting hole 111 corresponding to the base 12, so that the through-hole 122 on the base 12 and the limit slot 125 can be exposed to the offsetting hole 111.

Optionally, the base 12 can be provided with several locating slots 123.

Optionally, the cover plate can be provided with several locating slots 123 which are provided around the offsetting hole 111.

In one of the embodiments of the present disclosure, in combination with FIG. 1, the mounting base 1 is provided with some identification part 112 which are provided around the keycap 2; the periphery of the keycap 2 is provided with guiding block 25.

In this embodiment, the mounting base 1 can be made of plastics, and the mounting base 1 is provided with identification part 112. In other words, when the mounting base 1 is made of translucent plastics, identification part 112 can be provided on any surface of the mounting base 1, and identification part 112 can be colored identifications. When the mounting base 1 is made of colored plastics, the surface of the mounting base 1 back on the lamp body 4 is provided with identification part 112.

Optionally, identification part 112 could be the concave slot or convex part in a characteristic shape.

Optionally, the corresponding area of the identification part 112 can be coated with ink to form colored identification.

In one of the embodiments of the present disclosure, in combination with FIG. 10, the surface of the keycap 2 facing the mounting base 1 is provided with fastening part 24, and fastening part 24 and connecting rod 21 is provided at intervals; Fastening part 24 passes through the through-hole 122 and is against the peripheral wall of the through-hole 122, so that the keycap 2 is provided on the mounting base 1 in a dismountable way.

In this embodiment, fastening part 24 could be a snap spring whose one end connects to the mounting base 1 and the other end connects to the keycap 2, so that the keycap 2 is provided on the mounting base 1 flexibly.

In one of the embodiments of the present disclosure, the surface of the keycap 2 facing the mounting base 1 is provided with several fastening part 24. In other words, the keycap 2 is provided with two fastening parts 24 which is provided in the through-hole 122, so that the fastening part 24 is against the internal wall of the through-hole 122 and the keycap 2 is located in the through-hole 122.

Optionally, the keycap 2 can be provided with three and more fastening parts 24 which are provided around the connecting rod 21.

In one of the embodiments of the present disclosure, the external surface of the mounting base 1 is sunken to form a containing groove 113, and the through-hole 122 is provided at the bottom of the containing groove 113; the keycap 2 is contained in the containing groove partially at least.

In this embodiment, the external surface of the mounting base 1 forms a containing groove 113, and the keycap 2 is contained in the containing groove partially at least to reduce the height of the keycap 2 above the surface of the locating base, so that the appearance of the variable resistance power adjustment device is compact. In the meantime, the mounting base 1 can also hinder the clearance between the keycap 2 and the mounting base 1 partially, preventing dust from entering the clearance between the keycap 2 and the mounting base 1.

In another embodiment of the present disclosure, in combination with FIG. 11, the potentiometer 3 is slide-type potentiometer 3.

In one of the embodiments of the present disclosure, in combination with FIG. 12, FIG. 13 and FIG. 14, the potentiometer 3 of the resistance adjustment module connects to the primary coil of the transformer of the driving power supply.

The present disclosure also puts forward a kind of lamp. As shown in FIG. 1 and FIG. 11, the lamp includes the lamp body 4 and the resistance control device. The specific structure of the variable resistance power adjustment device refers to the above embodiment. Because the lamp adopts all technical schemes of all above embodiments, at least all the beneficial effects of the technical scheme of the above embodiment are obtained. It will not be repeated in unnecessary details here. Wherein, the variable resistance power adjustment device is provided at one end of the lamp body 4.

In one of the embodiments of the present disclosure, the mounting base 1 is made of translucent materials, the lamp is provided with a luminous lamp panel 41 which is covered by the mounting base 1. In this embodiment, the mounting base 1 is made of translucent materials, and a luminous lamp panel 41 is provided corresponding to the mounting base 1 to illuminate the area corresponding to the keycap 2, so that the user can identify and operate the keycap 2.

In one of the embodiments of the present disclosure, in combination with FIG. 8, the lamp also comprises a wire conduit 42 which is provided on the lamp body 4 and connects to the mounting cavity 121 of the base 12.

In one of the embodiments of the present disclosure, in combination with FIG. 8, the lamp body 4 comprises a lamp cap 43, a heat dissipation rack 44 and several luminous modules 46, the lamp cap 43 is provided with driving power supply, the heat dissipation rack 44 is provided on the lamp cap 43, the periphery of the heat dissipation rack 44 is provided with mounting slot 45, and one luminous module 46 is provided in one mounting slot 45 and connects to the driving power supply of the lamp cap 43 electrically.

The description is only the preferred embodiment of the present disclosure, and it is not for this reason that the patent scope of the present disclosure is limited. Any equivalent structural transformation made by using the description of the present disclosure and the attached FIG., or direct/indirect application in other related technical fields under the inventive concept of the present disclosure, is included in the patent protection scope of the present disclosure.

What is claimed is:

1. A variable resistance power adjustment device used for adjusting a power of a lamp body, comprising:

a mounting base connecting to the lamp body, working with the lamp body to form a mounting cavity in an enclosure way and provided with a through-hole connecting to the mounting cavity;

a keycap connecting to the mounting base flexibly and stretching into the through-hole partially; and a resistance adjustment module provided in the mounting cavity, the adjustment part of the resistance adjustment module connecting to the keycap, the resistance adjustment module connects to a driving power supply of the lamp body electrically, wherein the keycap rotates or slides to drive an adjustment part of the resistance adjustment module to rotate or slide, so that a corresponding resistance can be switched into the driving power supply from the resistance adjustment module and the resistance adjustment module adjusts the power of the lamp body;

wherein the resistance adjustment module comprises a fixed resistor and a potentiometer, and the fixed resistor and the potentiometer switch in the driving power supply of the lamp body in series;

wherein the adjustment part of the potentiometer connects to the keycap;

wherein the potentiometer is a knob-type potentiometer;

wherein a surface of the keycap facing the mounting base is provided with connecting rods which are provided in the through-hole and connects to the knob-type potentiometer;

wherein an external surface of the mounting base is also provided with limit slots, and the limit slots are provided around the through-hole; and wherein the surface of the keycap facing the mounting base is provided with a protruding limit post, the limit post and the connecting rod are provided in parallel, and the limit post can be provided in the limit slots in a slide way.

2. The variable resistance power adjustment device as in claim 1, wherein the limit slots are arc slots, an angle between connection lines of two ends of the arc slots and the through-hole is α; and a rotating angle of the potentiometer is β, and α≤β.

3. The variable resistance power adjustment device as in claim 1, wherein the external surface of the mounting base is also provided with several locating slots which are provided in a circular shape around the through-hole and provided at intervals with the limit slots; and the surface of the keycap facing the mounting base is provided with a protruding positioning column, the positioning column and the connecting rod are provided in parallel, and the positioning column can be provided in the locating slot in a slide way.

4. The variable resistance power adjustment device as in claim 3, wherein the surface of the mounting base facing the keycap is provided with several locating bars which are configured in a radiation shape centering on the through-hole, and two adjacent the locating bars form the locating slot.

5. The variable resistance power adjustment device as in claim 1, wherein the mounting base comprises:

a cover plate provided on the lamp body and provided with an offsetting hole; and the base provided on the lamp body, working with the lamp body to form the mounting cavity in an enclosure way, provided correspondingly to the offsetting hole, provided with the through-hole and the limit slots exposed to the offsetting hole.

6. The variable resistance power adjustment device as in claim 1, wherein the mounting base is provided with several identification parts which are provided around the keycap; and a surrounding of the keycap is provided with protruding guiding blocks.

7. The variable resistance power adjustment device as in claim 1, wherein an external surface of the mounting base is sunken to form a containing groove, the through-hole is provided at the bottom of the containing groove; and the keycap is contained in the containing groove partially at least.

8. The variable resistance power adjustment device as in claim 1, wherein the resistance adjustment module connects to a primary coil of a transformer of the driving power supply.

9. A variable resistance power adjustment device used for adjusting a power of a lamp body, comprising:

a mounting base connecting to the lamp body, working with the lamp body to form a mounting cavity in an enclosure way and provided with a through-hole connecting to the mounting cavity;

a keycap connecting to the mounting base flexibly and stretching into the through-hole partially; and a resistance adjustment module provided in the mounting cavity, the adjustment part of the resistance adjustment module connecting to the keycap, the resistance adjustment module connects to a driving power supply of the lamp body electrically, wherein the keycap rotates or slides to drive an adjustment part of the resistance adjustment module to rotate or slide, so that a corresponding resistance can be switched into the driving power supply from the resistance adjustment module and the resistance adjustment module adjusts the power of the lamp body;

wherein the resistance adjustment module comprises a fixed resistor and a potentiometer, and the fixed resistor and the potentiometer switch in the driving power supply of the lamp body in series;

wherein the adjustment part of the potentiometer connects to the keycap;

wherein the potentiometer is a knob-type potentiometer;

wherein a surface of the keycap facing the mounting base is provided with connecting rods which are provided in the through-hole and connects to the knob-type potentiometer;

wherein the surface of the keycap facing the mounting base is provided with fastening parts which are provided at intervals with the connecting rods; and wherein the fastening parts pass through the through-hole and are against a peripheral wall of the through-hole to make the keycap be provided on the mounting base in a dismountable way.

10. A lamp, comprising a variable resistance power adjustment device comprising a mounting base connecting to a lamp body, working with the lamp body to form a mounting cavity in an enclosure way and provided with a through-hole connecting to the mounting cavity;

a keycap connecting to the mounting base flexibly and stretching into the through-hole partially; and a resistance adjustment module provided in the mounting cavity, an adjustment part of the resistance adjustment module connecting to the keycap, the resistance adjustment module connects to a driving power supply of the lamp body electrically, wherein the keycap rotates or slides to drive the adjustment part of the resistance adjustment module to rotate or slide, so that a corresponding resistance can be switched into the driving power supply from the resistance adjustment module and the resistance adjustment module adjusts a power of the lamp body, and the variable resistance power adjustment device is provided on one end of the lamp body;

wherein the mounting base is made of translucent materials; and wherein:

the lamp is provided with a luminous lamp panel, the mounting base covers the luminous lamp panel, and/or the lamp also comprises a wire conduit provided on the lamp body and connecting to the mounting cavity of the mounting base, and/or the lamp body comprises a lamp cap, a heat dissipation rack and several luminous modules, the lamp cap is provided with a driving power supply, the heat dissipation rack is provided on the lamp cap, the surrounding of the heat dissipation rack is provided with mounting slots, one of the several luminous modules is provided in one the mounting slot and connects to the driving power supply of the lamp cap.

\* \* \* \* \*